United States Patent Office 3,275,587
Patented Sept. 27, 1966

3,275,587
ADHESIVE COMPOSITION COMPRISING AN EPOXY RESIN, AN AMINE CARBAMATE AND WATER
Ernest E. Weller, Sayreville, and James Plaganis, New Brunswick, N.J., assignors to Tile Council of America, Inc., New York, N.Y., a corporation of New York
No Drawing. Filed Sept. 25, 1962, Ser. No. 226,156
17 Claims. (Cl. 260—29.2)

The present invention relates to adhesive compositions and more particularly to unitary compositions comprising epoxy resins and an amine hardener which may be rendered functional simply by the addition of a liquid thereto.

The usefulness of epoxy resin adhesives is universally recognized, and the applications therefore are literally too numerous to mention. Despite their wide acceptance, conventional handling of such materials presents numerous problems. Because of their extraordinary qualities, however, epoxy resin adhesives have been generally accepted commercially in spite of the fact that they are frequently awkward to use.

Epoxy resin polymers are generally formed by bringing together an epoxide resin monomer or prepolymer and a liquid amine hardener. The two basic components are mixed intimately and the cross-linking and polymerization that takes place result in a product having extremely high bond strength and chemical resistance. The amine hardener is usually a diamine or a polyamine, i.e., a compound with two or more amino nitrogen groups. Such amine compounds are well understood in the art (see Lee and Neville, Epoxy Resins, McGraw-Hill, 1957) and have been recognized to be especially well suited for cross-linking with epoxy polymers because of their very high reactivity even at room temperature.

Because of the great reactivity of the polyamines with the epoxy resin, it has heretofore generally been necessary to prevent contact of the hardener and the epoxy resin until immediately before the hardening reaction is to be effected. This has required packaging of the hardener and the epoxy resin in separate containers, and the metering of proper weight or volume proportions of each at the time of use. The former requirement has been undesirable from the standpoint of efficient packaging and storage of these materials, and the latter requirement undesirable from the standpoint of convenience in use and reliability in unskilled hands.

The present invention avoids the disadvantages of the two part epoxy resin systems and provides a unitary adhesive composition comprising an epoxy resin and a carbamate of a polyamine which are hereinafter referred to as a carbamate. The carbamates of the present invention are produced by reaction of carbon dioxide with polyamine compounds, as will be brought out more clearly hereinbelow. The unitary compositions are activated by decomposing the carbamate to release carbon dioxide and the free amine, which then enters into the cross-linking reaction with the epoxy resin. Decomposition of the carbamate may be effected by heat, but is preferably effected by the addition of water. When activated by addition of water, the compositions of the instant invention cure at room temperature, and there is no need to heat to effect the cure. Addition of water, in addition to activating the polymerization reaction, also performs the function of giving fluidity to the unitary compositions, especially when the composition is in dry, pulverulent form.

As will be clear, the compositions of the present invention comprise the following substances.

An epoxy type monomer or prepolymer; a carbamate form of a polyamine compound and, at the time of use, means, such as water or heat, to decompose the carbamate and release the polyamine, which is then available for cross-linking reaction with the epoxy resin.

The ingredients of the unitary compositions may be solid or liquid in form but in the preferred embodiment all of the ingredients are in dry pulverulent form, so that the composition is a free flowing, one-part powder.

When all powder compositions are desired, accelerators may be used to promote the cure.

Especially suitable as accelerators and preferred for use are the oxides of alkaline metals, such as magnesium oxide, calcium oxide, barium oxide, and strontium oxide. When oxides of alkaline metals are employed, they combine with the carbon dioxide released from the carbamates to form alkaline metal carbonates. Some of the alkaline metal carbonates, e.g., magnesium carbonate, are even capable of hydrating, thereby eliminating from the composition excess water not required to release the amino compounds from the carbamates.

Also suitable as accelerators are solid weak acids or solid weak acid salts. Among the weak acids that may be used may be mentioned solid organic carboxylic acids, such as glycolic acid, lactic acid, acrylic acid, oxalic acid, malonic acid, succinic acid, adipic acid, pimelic acid, suberic acid, azelaic acid, sebacic acid, and the like. Weak solid inorganic acids or weak inorganic acid salts may also be used. Preferably the weak acid or weak acid salt should have an ionization constant at 20° C. of less than about $1 \times 10^{-2}$. When the acid has more than one carboxyl group or hydrogen atom, the ionization constant given refers to the first carboxyl group or hydrogen atom.

The hardeners for use in the present invention, hereinabove referred to as the carbamate form of a polyamino compound, represent an important feature of the invention and are prepared by the reaction of anhydrous polyamines or polyamine compounds with carbon dioxide.

Among the polyamines suitable for use in preparing the carbamate hardeners may be mentioned polyamines containing two or more amino nitrogens preferably attached to aliphatic carbon atoms, and simplified more particularly amines of the formulae:

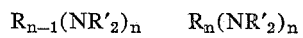

$$R_{n-1}(NR'_2)_n \qquad R_n(NR'_2)_n$$

where R is an alkyl, cycloalkyl, aralkyl or alkylene hydrocarbon radical; R' is an alkyl, cycloalkyl, aryl, aralkyl, or alkylene hydrocarbon group or hydrogen, and n is an integer from 2 to 10 or even higher. Preferably the polyamines contain 2 or more primary or secondary amino nitrogens, have not more than about 30 carbon atoms in the hydrocarbon groups connected to the amino nitrogens, and not more than a total of about 50 carbon atoms. Especially suitable are polyamines containing 2 or more primary amino nitrogens connected to an aliphatic hydrocarbon group containing 6 to 30 carbon atoms.

Examples of polyamines that may be used include ethylene diamine, propylene diamine, diethylene triamine, dipropylene triamine, triethylene tetramine, tripropylene tetramine, tetraethylene pentamine, tetrapropylene pentamine, and mixtures of the foregoing. Also may be mentioned higher alkyl polyamines, such as alkyl polyamines in which the alkyl group is butyl, hexyl, cyclohexyl, octyl, dodecyl and octodecyl. The higher alkyl polyamines are preferred over the lower alkyl polyamines for the reason that the carbamates formed therefrom are less hygroscopic, less easily sublimed and have less odor, compared to the carbamates formed from the lower alkyl polyamines.

Due to their greater availability, commercially produced polyamine compounds are particularly suitable in preparing the carbamate hardeners. Examples of such commercially available amines are those obtained under the trade names "Duomeen O" and "Duomeen S." "Duomeen O" consists essentially of a mixture of n-alkyl trimethylene diamines derived from technical grade oleic acid. The alkyl group content is distributed as follows:

| | Percent |
|---|---|
| C-14 | 2 |
| C-16 | 5 |
| C-18 | 93 |

"Duomeen S" consists essentially of a mixture of N-alkyl trimethylene diamines derived from soya acids. The alkyl group content is distributed approximately as follows:

| | Percent |
|---|---|
| C-16 | 13 |
| C-18 | 87 |

Also may be mentioned N-tallow bis (amino propyl) amine, which is a product supplied under the trade name XC-95.

Preferred carbamates for use in the present invention may be made from poly-amido-amines.

The poly-amido-amines are produced by copolymerization of polyamines of the type described above with polycarboxylic acids, the copolymerization reaction being permitted to proceed to such an extent that the products produced are soluble in both epoxy resin and water.

In conducting the copolymerization reaction, it is important that excess polyamine be used, so that the resulting poly-amido-amines have free amino groups for reaction with carbon dioxide to form the carbamate.

The poly-amido-amines are prepared by reacting the polyamines and polycarboxylic acids described herein at temperatures below the decomposition temperature of the polyamines by employing the appropriate polyamine in stoichiometric excess of that theoretically required to react with the appropriate polycarboxylic acid. The temperature of the reaction is preferably between about 100° and 200° C. Especially good results are achieved when the temperature is between about 120° and 160° C.

Aliphatic polyamines containing two or more amino nitrogens such as those described hereinabove may be used to produce such poly-amido-amines. Polyamines containing primary nitrogens are especially suitable.

The polycarboxylic acids suitable for reaction with the above described polyamines to produce poly-amido-amines have at least two carboxyl groups and may be represented by the formula $R(COOH)_n$, where R is a hydrocarbon radical which may be saturated or unsaturated, aliphatic, cyclicaliphatic, or heterocyclic, and $n$ is an integer having a value of at least 2. Among the preferred polycarboxylic acids are the straight chained saturated dicarboxylic acids such as adipic, pimelic, suberic, azelaic, sebacic, nonane dicarboxylic acid, and the higher members of this series, including mixtures thereof. Also may be mentioned straight chained unsaturated dicarboxylic acids, including citraconic acid, mesaconic acid and itaconic acid. Especially suitable for use are the so-called resin acids. These may be classified as diterpene acids, a major constituent being abietic acid. When such diterpene acids are dimerized, a dicarboxylic acid results. Particularly useful are those diterpene acids which, upon being dimerized, have a formula weight of about 300 to 900, and preferably between about 500 to 600.

The poly-amido-amines are produced by dissolving the polycarboxylic acid and polyamine in a suitable organic solvent, in which the polyamine and the polycarboxylic acid are soluble. The amount of the polyamine is in excess of that stoichiometrically required to react with the polycarboxylic acid. The amount of excess polyamine is preferably at least about 5 percent, may be between about 5 and 200 percent, or higher, and is preferably between about 50 and 150 percent, based on the polycarboxylic acid. The solvent is preferably removed, for example, by evaporation. The residue remaining after solvent evaporation is then heated to a temperature of between about 100° to 200° C., care being taken that the temperature employed is below the decomposition temperature of the polyamine used. The time of heating should be at least about one-half hour, or between about 1 and 16 hours. Although the solvent is preferably removed prior to heating, it should be understood that the solvent may also be removed after heating.

Poly-amido-amines suitable for use herein are commercially available. Typical of these materials are those sold under the tradenames XR-2000 and EM-308.

Polyamides suitable for use herein are also commercially available. Typical of such materials are those sold under the tradenames Versamid-115, Versamid-125 and Pentamid-2.

These polyamides are condensation products of dimeric fatty acids and polyamines and have amine value of 80 to 400. They are available as thermoplastic resins having a softening point of from 90-190° C., and also as solutions of such resins.

The carbamates are formed by reaction of dry carbon dioxide on the anhydrous polyamine or polyamine compounds described herein. In its simplest form, the reaction can be carried out by bubbling carbon dioxide through the anhydrous liquid amine or liquid amine compound. Generally an excess of carbon dioxide is used. The end of the reaction is reached when the initial exothermic reaction ceases and the temperature starts to drop. The products generally separate as crystalline solids or as oils which may crystallize on standing.

Alternatively the carbamates may be prepared by reaction of dry, solid carbon dioxide on the anhydrous amines or amino compounds.

A preferred method is to add excess crushed, solid, anhydrous carbon dioxide to the amine or amino compound with good mechanical mixing and volatilization of excess carbon dioxide. Excellent products ready for packaging or blending are obtained from such a technique. The low temperature of preparation seems to be a desirable feature, since the heat of reaction is rapidly dissipated.

Examples showing the way in which the carbamate hardeners may be made will now be described.

CARBAMATE HARDENER A

Bone dry carbon dioxide was bubbled through 100 grams of liquid diethylene triamine until the exothermic reaction was completed, as indicated by a drop in temperature. A waxy solid precipitated which was remarkably stable in the absence of moisture and also in the presence of a liquid epoxy resin.

CARBAMATE HARDENER B

Bone dry carbon dioxide was bubbled through 100 grams of liquid N-tallow Bis (amino-propyl) amine, a product known as XC-95. The reaction was continued until complete, as was noted by a drop in temperature of the reaction mixture. A waxy solid precipitated which was stable in the absence of moisture and in the presence of epoxy resin.

CARBAMATE HARDENER C

In this example a condensation product of dimeric fatty acid with polyamines in liquid form supplied under the tradename Versamid 125 and described hereinabove was used as the starting material. Bone dry carbon dioxide was bubbled through 100 grams of the liquid Versamid 125 until reaction was complete, as noted by a drop off in temperature of the reaction mixture. The waxy solid formed was separated from the reaction mixture by filtration and drying. It was stable in the absence of moisture and in the presence of epoxy resin.

CARBAMATE HARDENER D

To 1000 grams of a poly-amido-amine commercially available and marketed as "EM-308" was added an excess of crushed, solid, anhydrous carbon dioxide with good mechanical stirring. The mass, which solidified rapidly, was ground by the mechanical mixing to a fine powder. The mixing was continued and the mass protected from moisture until all excess carbon dioxide had volatilized. The product was a yellowish-tan powder, extremely stable in the absence of water and in the presence of liquid epoxide resins.

CARBAMATE HARDENER E

Crushed, solid, anhydrous carbon dioxide was added to 1000 grams of an epoxy co-reactant known as XR–2000. XR–2000 has an amine value of 580–620 and a viscosity of 20–35 poises at 25° C. Again, a solid, powdered product was obtained without the use of extraneous solvents, and it too exhibits good stability under dry conditions.

CARBAMATE HARDENER F

As with Hardeners D and E, an excess of crushed, solid, anhydrous carbon dioxide was added to a polyamide resin which has an amine value of 290–320 and a viscosity of 8–13 poise at 23° C. The product is known as Pentamid 2. Similarly, a fine powder was obtained which is sensitive to water but otherwise stable on storage.

The resinous epoxides suitable for use in the present invention comprise those compounds having at least two epoxy groups, i.e., at least two

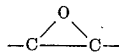

groups. The polyepoxides may be saturated or unsaturated, cycloaliphatic, heterocyclic, or preferably aliphatic, and may be substituted if desired with substituents such as chlorine atoms, hydroxyl groups, ether radicals, and the like. They may also be monomeric or polymeric.

Examples of the polyepoxides include, among others, epoxidized glycerol dioleate,
1,4-bis(2,3-epoxypropoxy) benzene,
1,3-bis(2,3-epoxypropoxy) benzene,

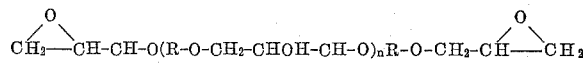

wherein R is a divalent hydrocarbon radical of the dihydric phenol and $n$ is an integer of the series 0, 1, 2, 3, etc. While for any single molecule of the polyether $n$ is an integer, the fact that the obtained polyether is a mixture of compounds causes the determined value for $n$ to be an average which is not necessarily zero or a whole number. The polyethers may in some cases contain a very small amount of material with one or both of the terminal glycidyl radicals in hydrated form.

The aforedescribed glycidyl polyethers of the dihydric phenols may be prepared by reacting the required proportions of the dihydric phenol and the epichlorohydrin in an alkaline medium. The desired alkalinity is obtained by adding basic substances, such as sodium or potassium hydroxide, preferably in stoichiometric excess to the epichlorohydrin. The reaction is preferably accomplished at temperatures within the range of from 50° C. to 150° C. The heating is continued for several hours to effect the reaction and the product is then washed free of salt and base.

These epoxy resins are available in several forms varying from a viscous liquid to a solid resin. Especially suitable are those resins which are liquid or near their softening point at room temperature.

Typical of the epoxy resins which may be employed are the epichlorohydrin-bis-phenol type sold under the trademarks "Epon Resins," "Gen Epoxy," "DER Resins," "ERL Resins" and "Epi-Rez"; and "Epiphen" resins, having an average functionality of three. An example of a trifunctional resin is "Epiphen" ER–823, which has the following formula:

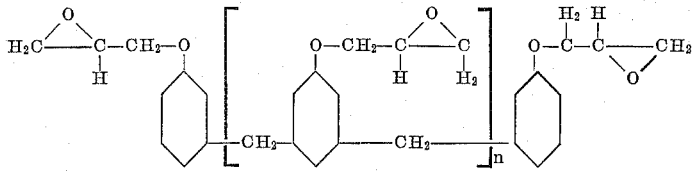

4,4'-bis(2,3-epoxypropoxy) diphenyl ether,
1,8-bis(2,3-epoxypropoxy)-octane,
1,4-bis(2,3-epoxypropoxy)-cyclohexane,
4,4'-bis(2-hydroxy-3,4'-epoxybutoxy)-diphenyldimethylmethane,
1,3-bis(4,5-epoxypentoxy)-5-chloro-benzene,
1,4-bis(3,4-epoxybutoxy)-2-chlorocyclohexane,
1,3-bis(2-hydroxy-3,4-epoxybutoxy) benzene, and
1,4-bis(2-hydroxy-4,5-epoxypentoxy) benzene.

Among the preferred epoxides are the epoxy polyethers of polyhydric phenols obtained by reacting a polyhydric phenol with a halogen containing epoxide or dihalohydrin in an alkaline medium. Polyhydric phenols that can be used for this purpose include, among others, resorcinol, catechol, hydroquinone, methyl resorcinol, or polynuclear phenols, such as 2,2-bis(4-hydroxyphenyl) propane (Bisphenol A), 2,2-bis(4-hydroxyphenyl) butane, 4,4'-dihydroxybenzophenone, bis(b-hydroxyphenyl) ethane, 2,2-bis(4-hydroxyphenyl) pentane, and 1,5-dihydroxynaphthalene. The halogen-containing epoxides may be further exemplified by 3-chloro-1,2-epoxybutane, 3-bromo-1,2-epoxyhexane, 3-chloro-1,2-epoxyoctane, and the like.

The monomer products produced by this method from dihydric phenols and epichlorohydrin may be represented by the general formula:

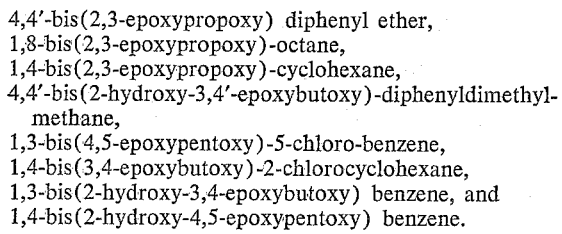

wherein R represents a divalent hydrocarbon radical of the dihydric phenol. The polymeric products will generally not be a single simple molecule but will be a complex mixture of glycidyl polyethers of the general formula:

where $n$ is a number such that the resin has an epoxy equivalent of 180–200.

The epoxide resins suitable for use in the present invention may contain between about 0.05 and 15 times, and preferably between about 3 and 12 times the weight of epoxy resin, of an inert, finely divided solid material.

Suitable finely divided inert solid materials for use with the epoxy resins include fillers, such as asbestos, Albalith, silica, mica, flint powder, quartz, cryolite, calcium sulfate, Portland cement, limestone, atomized alumina, barytes, talc, pyrophyllite, various clays, diatomaceous earth, and other like materials. Also may be mentioned pigments, such as titanium dioxide, cadmium red, carbon black, aluminum powder, and the like.

Suitable other colorants may be added to the epoxy resin if desired. Typical of these are: National Fast Red; Calco Condensation Green A.Y.; Calco Condensation Blue; Bismark Brown; Blue Lake (13% Ponsal Blue, 10% aluminum hydrate and 77% blanc fixe), Krebs BP–179–D, Blue Lake Krebs BP–258–D, Lithol Tower, Chrome Yellow, Iron Blue, Milari Blue, Monastral Green, Maroon Toner, Chrome Green, Chrome Orange, Iron Oxide Reds, aluminum powder, and flatting agents like diatomaceous silica and silica aerogel. The color materials should be selected, however, so as to be non-reactive with the epoxy resins and other ingredients at atmospheric temperature, as otherwise this might cause poor storage stability and also affect the retention of adhesiveness.

The finely divided inert solid materials suitable for use herein may have an average particle size ranging between about 40 mesh and 600 mesh (U.S. Std. Series). The exact size of the inert finely divided solid materials will depend upon the particular application of the compositions.

In addition to finely divided solid materials, a wide variety of resinous modifiers may be added to the epoxy resin systems disclosed herein. Among these may be mentioned the phenolic resins, such as aniline formaldehyde resins; urea resins, such as urea formaldehyde resins; melamine resins, such as melamine formaldehyde resins; polyester resins, such as those produced from polybasic acids and polyhydroxyl alcohols and which may contain free carboxyl groups and/or aliphatic hydroxyls capable of reacting with the epoxy resins; vinyl resins such as vinyl chloride, vinylidene chloride and the like; and polystyrene. The resinous modifiers may vary from about 1 to about 100 percent or more, by weight, based on the weight of the epoxy resin.

When the epoxy resins are liquid, these are preferably absorbed or otherwise carried on inert materials or fillers to make an all powder composition. As an example of such inert materials may be mentioned zirconium silicate, silica aerogel, blanc fixe, talc, pyrophyllite, various clays, diatomaceous earth, and other like inert materials. The carriers for the epoxy resins are preferably in a fine state of subdivision, and have high surface areas. Good results are also achieved when aggregates or pigments, such as sand, titanium dioxide, barium oxide and the like are used in combination with such fillers.

Zirconium silicate or silicon aerogel and titanium dioxide or sand are particularly suitable as a combination carrier and pigment for the epoxy resin of the present invention. These materials in combination insure the availability of a great surface for contact of the epoxy resins and the amine when it is released from the carbamate hardener.

Liquid epoxide resins described herein through intermixture with and absorption on the inert materials and aggregates described may be made substantially dry and can be dry mixed with the carbamate hardener, which is usually a crystalline solid. Since some of the carbamates precipitate as an oil, it may be necessary with such materials to adsorb the carbamate oil on a filler or aggregate in order to obtain an all-powder mixture. The mixtures are relatively uniform and therefore may be prepared in such manner that any portion may be removed from the whole and still retain substantially the proportion of epoxy resin and amine hardener which were orginally determined to be most suitable for the particular ingredients used in making up the dry composition.

In forming the epoxy resin bonding compositions, enough of the carbamate hardener in the form described is added to the epoxy resin composition to insure that upon activation, good hardening is achieved. Preferably the hardener and epoxy resin are present in the dry compositions in stoichiometric proportions. Depending on the nature of the adhesive composition desired, however, greater or lesser amounts of the hardener may, of course, be used.

When water is added to the compositions to make them functional, i.e., to initiate and cause polymerization, the water decomposes the carbamate to release the free amine and carbon dioxide; thereby making the free amine available for reaction and hardening of the epoxide resin. In the absence of moisture, the unitary compositions are extremely stable.

The unitary compositions, rather than being activated by water, may be activated by heating to temperatures of above about 100° C., e.g., 100° to 200° C. The application of heat decomposes the carbamate and liberates carbon dioxide and the free amine. The free amine then enters into the cross-linking reaction with the epoxy resin. Depending upon stoichiometry and temperature, the epoxy polymer formed may be foamed or non-foamed, as will be clear from the examples given hereinbelow.

Epoxy resin compositions in the form described herein are particularly adapted for use as trowellable mortars or as grouts to set ceramic tiles, and to fill the joints between the tiles and it is among the objects of this invention to provide compositions for such applications, and also to provide methods for grouting and setting ceramic tile using such compositions. According to one embodiment of the method, the adhesive compositions following activation, are spread on a substratum to a thickness of about 1/16 to 3/8 inch, and ceramic tile set in the resulting adhesive base, tapped in place, and the adhesive composition then permitted to cure.

In grouting, an assembly containing a plurality of ceramic tile in edge to edge relationship with spaces between the tile is prepared, and the spaces between the tile filled with the activated adhesive compositions described herein. When used to set and grout ceramic tile, the epoxy resin compositions form a hard, adherent, chemically resistant bond. These compositions also have the advantage that they cure at room temperature, thereby rendering their use for this purpose especially advantageous.

Compositions especially suitable and preferred for setting and grouting ceramic tile ordinarily comprise between about 3 and 12 times by weight of the epoxy resin of an inert finely divided filler or aggregate of the type described hereinabove.

The epoxy resin compositions comprising hardeners in the form described bond exceedingly well to ceramic tile edges and to the backs of ceramic tile. Additionally, these compositions are flexible, and resistant to moderate temperature change. Also, such compositions are resistant to acid and alkali attack.

Specific examples embodying the teachings set forth above are here given by way of exemplification and not restriction.

*Example 1*

Twelve grams of carbamate hardener A was combined with 100 weight parts of a liquid epoxy resin of the epichlorohydrin-bis-phenol of acetone type having a viscosity of about 13,000 centipoises at 20° C., and an epoxide equivalent weight of about 185 grams. The resin was supplied under the name Epon Resin 828.

The resulting product was a stable paste. The addition of 10 parts of water caused hardening within 24 hours at room temperature.

*Example 2*

Example 1 was repeated with the exception that the unitary paste comprising the epoxy resin and carbamate hardener A was cured in the form of a foam without the addition of water by heating to 150° C. A rigid foam of superior strength was obtained.

*Example 3*

A free flowing epoxy resin powder was made by admixing 100 grams of the epoxy resin of Example 1 with 500 grams finely divided silica and 500 grams of finely divided calcium carbonate. The silica and calcium carbonate were pre-blended prior to admixture with the epoxy resin. Into the resulting dry mixture was blended 13 grams of carbamate hardener A. The resulting unitary composition was stable for long periods of time in the absence of water. Upon the addition of 100 grams of water, the mass became liquefied and cured to a satisfactory hard solid in about 24 hours.

*Example 4*

A finely divided, free flowing, epoxy resin composition was prepared by blending the following materials:

| | Parts by weight |
|---|---|
| Epon 828 (liquid) | 8 |
| Powdered limestone | 92 |
| Carbamate hardener B | 4 |

In blending, the liquid Epon 828 was first combined with the powdered limestone to form a powder, to which was added carbamate hardener B.

The resulting unitary all-powder composition was free flowing and stable in the absence of moisture. Upon the addition of 15 weight parts of water, a paste was formed which was satisfactory for use as a mortar or grout for setting or pointing ceramic tile. The paste cured to a hard solid in about 24 hours.

Example 5

A finely divided, free flowing epoxy resin composition was prepared by blending the following materials:

| | Grams |
|---|---|
| Epon 828 (liquid) | 100 |
| Silica (15 microns) | 500 |
| Barytes | 300 |
| Titanium dioxide | 200 |
| Silicon aerogel | 40 |

To the dry epoxy resin composition was added 35 grams of carbamate hardener C. The resulting admixture was stable in the absence of moisture for long periods of time.

The addition of 10 to 12 percent water, based on the total weight of the mixture, yields a semi-fluid or paste which is satisfactory for setting or grouting ceramic tile. The resulting mixture cures to a hard solid within about 24 hours at ordinary temperatures.

Example 6

The adhesive composition of Example 5 after the addition of water is spread on a concrete substratum to provide a mortar bed about $\frac{1}{8}''$ thick. Ceramic tile, $1\frac{1}{2}'' \times 1\frac{1}{2}''$, premounted on the face of $1' \times 2'$ sheets with about $\frac{1}{8}''$ spacing between the tile are laid on the mortar bed and beat to level. After 24 hours, the paper is removed from the face of the tile and the joints between the tile grouted with more of the composition of Example 5. Following grouting, excess adhesive on the surface of the tile is removed by wiping with a cloth. After about 24 hours, a strong but flexible bond between the tile and substrate and between adjacent tiles is obtained. The resulting installation has high wear resistance.

Example 7

A finely divided, free flowing epoxy resin composition was prepared by blending the following materials:

| | Grams |
|---|---|
| Epon 828 (liquid) | 181.32 |
| Polystyrene resin (Picco A-5)[1] | 54.54 |
| Titanium dioxide | 151.06 |
| Barytes | 603.22 |
| Silica (15 micron) | 36.32 |
| Silica (200–300 mesh) | 50.16 |

[1] The polystyrene resin is a non-reactive olefin modified liquid polymer used to extend the binder portion.

To the above finely divided powder was added, with good blending, 100 g. of hardener D. The powdered epoxy resin mixture is extremely stable in the absence of moisture.

With the addition 10 percent water by weight of the powder, a smooth paste is obtained, which is suitable for setting or grouting ceramic tile. The mixture hardens in about 24 hours.

Example 8

A finely divided, free flowing epoxy resin composition was prepared by blending the following materials:

| | Grams |
|---|---|
| Silica (50–100 mesh) | 2842.5 |
| Silica (15 micron) | 447.5 |
| Silica aerogel | 268.0 |
| Carbon black | 3.0 |
| Asbestos | 43.0 |
| Oleic acid | 8.0 |
| Epon 828 | 807.0 |

To 100 g. of the above powder was added 10 g. of hardener E and 5 g. of magnesium oxide. Upon the addition of about 10 percent by weight of the dry blend of water, a tacky paste was obtained which is suitable for setting or grouting ceramic tile. The mass cured to a hard solid in about 24 hours.

Example 9

To 100 g. of the powdered epoxy resin portion prepared under Example 8 was added 8 g. of hardener F. The addition of about 10 percent water based upon the weight of the dry composition yielded a satisfactory paste for use in setting or grouting ceramic tile.

Example 10

A powdered epoxy resin portion was prepared by admixing 100 g. of calcined calcium sulfate and sufficient water to make a slurry with 25 g. of Epon 828. The calcium sulfate was allowed to hydrate, and excess water dried off by evaporation. The resulting hard, dry mass was ground to a finely divided, free flowing powder.

To the above powder was added 15 g. of hardener D. The resulting powder blend was extremely stable in the absence of water. Upon the addition of 15 g. of water, a fine paste is obtained which cures to a hard solid in about 24 hours.

Example 11

Example 8 was repeated with the omission of the magnesium oxide and the addition of 1.5 g. per hundred grams of powder of citric acid as an accelerator. The addition of water (10 percent by weight of dry powder) again yielded a smooth paste which cured in about 16 hours to a hard solid.

The invention in its broader aspects is not limited to the specific steps, methods, compositions and improvements shown and described herein, but departures may be made within the scope of the accompanying claims without departing from the principles of the invention and without sacrificing its chief advantages.

What is claimed:

1. A unitary, one-part bonding composition which comprises in intimate admixture (a) an epoxy resin having the reactive epoxy group,

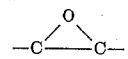

and (b) as the epoxy resin hardener, a carbamate which is a member selected from the group consisting of polyamide carbamates, wherein said polyamide carbamates are formed from polyamides having amine values of at least 80, and poly-amido-amine carbamates, wherein said carbamate on the addition of water at about ambient temperature decomposes to release said poly-amido-amine and polyamide and carbon dioxide which released poly-amido-amine and polyamide is capable of entering into a cross linking reaction with the epoxy resin, and in admixture with said composition a sufficient amount of water to carry out said cross-linking reaction.

2. The composition of claim 1 wherein the carbamate is a poly-amido-amine product formed by reacting an excess of a polyamine with a carboxylic acid compound.

3. The composition of claim 1 wherein the epoxy resin is the product of reaction of epichlorohydrin, with 2,2-bis-(4-hydroxyphenyl) propane.

4. The composition of claim 1 wherein the epoxy resin has an average epoxide functionality of three having the formula,

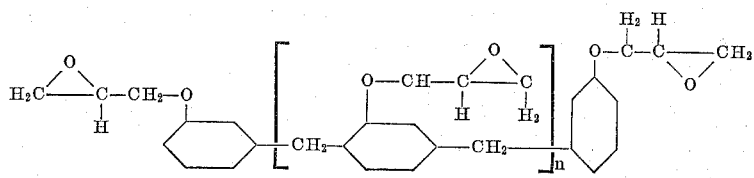

where *n* is a number such that the resin has an epoxy equivalent of 180–200.

5. The method of forming an adhesive composition which comprises adding water to a unitary composition comprising in intimate admixture an epoxy resin having the reactive epoxy group

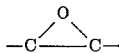

and a carbamate of a polyamine capable of entering into a cross-linking reaction with the epoxy resin when released from the carbamate.

6. In a method of setting tile on a substrate, the improvement which comprises preparing a mortar by adding water to a unitary composition comprising in intimate admixture an epoxy resin having the reactive epoxy group

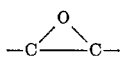

and a carbamate form of a polyamine, said carbamate being capable of entering into a cross-linking reaction with the epoxy resin, covering the substrate with a bed of the mortar, setting tile in the bed, and allowing the mortar to cure.

7. In a method of grouting tile, the improvement which comprises preparing an adhesive grout composition by adding water to a unitary composition comprising in intimate admixture an epoxy resin having the reactive epoxy group

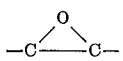

and, as the epoxy resin hardener, a carbamate of a polyamine capable of entering into a cross-linking reaction with the epoxy resin; preparing an assembly of ceramic tile in edge to edge relationship with spaces between the tile; filling the spaces with the grout; and permitting the grout to harden.

8. A unitary, one-part bonding composition which comprises, in intimate admixture (a) an epoxy resin which is an epoxy polyether of a polyhydric phenol and which contains a reactive epoxy group

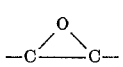

and (b) as the epoxy resin hardener, a carbamate, which is a member selected from the group comprising polyamido-amine carbamates and polyamide carbamates wherein said polyamide carbamates are formed from polyamides having amine values of at least 80, said carbamate being capable of entering into a cross-linking reaction with the epoxy resin when carbon dioxide is released from the carbamate and containing at least two amino nitrogens selected from the group consisting of primary amino nitrogen and secondary amino nitrogen, said amino nitrogens being attached to a hydrocarbon group containing not more than about 30 carbon atoms, said poly-amido-amine and polyamide compounds having not more than a total of about 50 carbon atoms and (c) water in at least a sufficient amount to decompose said carbamate and carry out said reaction.

9. The composition of claim 8 wherein the epoxy resin is the epoxy polyether formed by reacting a dihydric phenol with epichlorohydrin.

10. The composition of claim 1, wherein the carbamate contains at least two amino nitrogens selected from the group consisting of primary amino nitrogen and secondary amino nitrogen, said amino nitrogens being attached to a hydrocarbon group containing not more than about 30 carbon atoms, said carbamate having not more than a total of about 50 carbon atoms.

11. A method of preparing an adhesive composition which comprises preparing a one-part composition comprising an epoxy resin having the active epoxy group

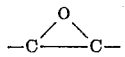

and a carbamate which is a member selected from the group consisting of polyamide carbamates, wherein said polyamide carbamates are formed from polyamides having amine values of at least 80, and poly-amido-amine carbamates, said carbamate being capable of entering into a cross-linking reaction with the epoxy resin, and adding a sufficient amount of water to said composition to decompose the carbamate.

12. A composition which comprises in admixture (a) an epoxy resin having the reactive epoxy group

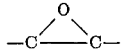

(b) as an epoxy resin hardener, a carbamate of a polyamine capable of decomposing on the addition of water at about ambient temperature to release carbon dioxide and a polyamine, said polyamine being capable of entering into a cross-linking reaction with the epoxy resin, and (c) water in at least a sufficient amount to decompose said carbamate and carry out said reaction.

13. A composition which comprises in admixture (a) an epoxy resin having the reactive epoxy group

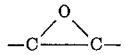

(b) as an epoxy resin hardener, a carbamate of a poly-amido-amine capable of decomposing on the addition of water at about ambient temperature to release carbon dioxide and a poly-amido-amine, said poly-amido-amine being capable of entering into a cross-linking reaction with the epoxy resin, and (c) water in at least a sufficient amount to decompose said carbamate and carry out said reaction.

14. A composition which comprises in admixture (a) an epoxy resin having the reactive epoxy group

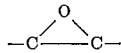

(b) as an epoxy resin hardener, a carbamate of a polyamide wherein said polyamide used to form said carbamate has an amine value of at least 80, said carbamate being capable of decomposing on the addition of water at about ambient temperature to release carbon dioxide and a polyamide, said polyamide being capable of entering into a cross-linking reaction with the epoxy resin, and (c) water in at least a sufficient amount to decompose said carbamate and carry out said reaction.

15. The method of forming an adhesive composition which comprises preparing a composition comprising an epoxy resin having the reactive epoxy group

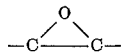

and a polyamine carbamate hardener, said carbamate being capable of decomposing on the addition of water to said composition to release a polyamine compound capable of entering into a cross-linking reaction with the epoxy resin and adding at least a sufficient amount of water to said composition to decompose said carbamate, release said polyamine and form said adhesive.

16. The method of forming an adhesive composition which comprises preparing a composition comprising an epoxy resin having the reactive epoxy group

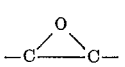

and a poly-amido-amine carbamate hardener, said carbamate being capable of decomposing on the addition of water to said composition to release a poly-amido-amine compound capable of entering into a cross-linking reaction with the epoxy resin and adding at least a sufficient amount of water to said composition to decompose said carbamate, release said poly-amido-amine and form said adhesive.

17. The method of forming an adhesive composition which comprises preparing a composition comprising an epoxy resin having the reactive epoxy group

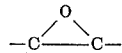

and a polyamide carbamate hardener, wherein said polyamide carbamate is formed from a polyamide having an amine value of at least 80, said carbamate being capable of decomposing on the addition of water to said composition to release a polyamide compound capable of entering into a cross-linking reaction with the epoxy resin and adding at least a sufficient amount of water to said composition to decompose said carbamate, release said polyamide and form said adhesive.

References Cited by the Examiner

UNITED STATES PATENTS

| | | | |
|---|---|---|---|
| 2,136,928 | 11/1938 | Schlack | 260—47 |
| 2,681,901 | 6/1954 | Wiles et al. | 260—47 |
| 2,819,233 | 1/1958 | Smith et al. | 260—47 |
| 3,026,270 | 5/1962 | Robinson | 260—77.5 |
| 3,036,980 | 5/1962 | Dunham et al. | 260—31.4 |

FOREIGN PATENTS 629,111   9/1949   Great Britain.

OTHER REFERENCES

Chemical Abstracts 43, 6157 i.

Katchalski et al., in Journal of the American Chemical Society, 73, 1829–31 (1951).

Lee et al., Epoxy Resins, McGraw-Hill, N.Y., 1957, TP 986 E6L4 (pp. 116 and 281 relied on).

MURRAY TILLMAN, *Primary Examiner.*

JAMES A. SEIDLECK, LEON J. BERCOVITZ, *Examiners.*

E. J. TROJNAR, J. C. BLEUTGE, *Assistant Examiners.*